United States Patent
Triantafillopoulos et al.

(10) Patent No.: US 6,881,778 B2
(45) Date of Patent: Apr. 19, 2005

(54) POLYVINYL ALCOHOL COPOLYMER COMPOSITION

(75) Inventors: Nick G. Triantafillopoulos, Silver Lake, OH (US); Carla B. Dittman-McBain, Wadsworth, OH (US); I. John Westerman, Wadsworth, OH (US); Michael F. Richardson, Cuyahoga Falls, OH (US); William C. Floyd, Chester, SC (US)

(73) Assignee: OMNOVA Solutions Inc., Fairlawn, OH (US)

( * ) Notice: Subject to any disclaimer, the term of this patent is extended or adjusted under 35 U.S.C. 154(b) by 0 days.

(21) Appl. No.: 10/325,055

(22) Filed: Dec. 19, 2002

(65) Prior Publication Data

US 2003/0125453 A1 Jul. 3, 2003

Related U.S. Application Data

(63) Continuation of application No. 09/724,995, filed on Nov. 28, 2000, now abandoned.
(60) Provisional application No. 60/172,897, filed on Dec. 21, 1999.

(51) Int. Cl.[7] .................................................. C08F 2/16
(52) U.S. Cl. ...................... 524/459; 524/503; 526/202
(58) Field of Search ................................ 524/459, 503; 526/202

(56) References Cited

U.S. PATENT DOCUMENTS

| | | | |
|---|---|---|---|
| 3,959,205 A | 5/1976 | Kobayashi et al. |
| 4,397,968 A | 8/1983 | Eck et al. |
| 4,879,336 A | 11/1989 | Schilling et al. |
| 4,912,184 A | 3/1990 | Akasaki et al. |
| 5,156,707 A | 10/1992 | Kato et al. |
| 5,200,459 A | 4/1993 | Weih et al. |
| 5,270,103 A | 12/1993 | Oliver et al. |
| 5,354,803 A | 10/1994 | Dragner et al. |
| 5,387,638 A | 2/1995 | Nakamae et al. |
| 5,545,826 A | 8/1996 | Amici et al. |
| 5,635,297 A | 6/1997 | Ogawa et al. |
| 5,739,179 A | 4/1998 | Chiou et al. |
| 5,755,929 A | 5/1998 | Kuroyama et al. |
| 5,786,100 A | 7/1998 | Tsuruoka et al. |
| 5,830,934 A | 11/1998 | Krishnan |
| 5,849,831 A | 12/1998 | Takada |
| 5,851,684 A | 12/1998 | Matscheko et al. |
| 5,885,719 A | 3/1999 | Perrin |
| 5,897,411 A | 4/1999 | Stark et al. |
| 5,900,451 A | 5/1999 | Krishnan et al. |
| 5,936,020 A | 8/1999 | Freidzon |
| 5,959,029 A | 9/1999 | Koelliker et al. |
| 6,001,903 A | 12/1999 | Nakamae et al. |
| 6,221,952 B1 | 4/2001 | Nakamae |
| 6,268,422 B1 | 7/2001 | Weih et al. |
| 6,291,573 B1 | 9/2001 | Pakusch et al. |
| 6,297,317 B1 | 10/2001 | Egraz et al. |
| 6,300,403 B1 | 10/2001 | Mayer et al. |
| 6,302,999 B1 | 10/2001 | Engelhardt et al. |

FOREIGN PATENT DOCUMENTS

| | | |
|---|---|---|
| EP | 0 044 995 | 2/1982 |
| EP | 516360 | 2/1992 |
| EP | 0 516 360 | 12/1992 |
| GB | 609138 | 9/1948 |
| SU | 798212 | 1/1981 |
| WO | WO 01/44329 | 6/2001 |
| WO | WO 01/44574 | 6/2001 |

OTHER PUBLICATIONS

Abstract of Japanese Application No. 04334337 (Dec. 15, 1992).
Abstract of Japanese Application No. 50–34630.

*Primary Examiner*—Judy M. Reddick
(74) *Attorney, Agent, or Firm*—Arthur M. Reginelli

(57) ABSTRACT

A polyvinyl alcohol copolymer latex composition comprises an intimate polymer composition obtained from 10% to 60% by weight of a substantially hydrolyzed low molecular weight polyvinyl alcohol (PVOH); 2% to 80% by weight of at least one diene; 2% to 80% by weight of at least one hydrophobic monomer other than a diene and optionally either up to 10% by weight of at least one hydrophilic ethylenically unsaturated acid monomer or up to 40% by weight of a cationic monomer. The copolymer latex composition can be prepared as an emulsion from an aqueous blend of the above listed monomers which are generally added at various stages during the polymerization and a free radical initiator, surfactants, and, if desirable, chain transfer agents. Up to 80% of the PVOH may be added after the monomers have been polymerized.

13 Claims, No Drawings

POLYVINYL ALCOHOL COPOLYMER COMPOSITION

This application is a continuation of U.S. patent application Ser. No. 09/724,995, filed on Nov. 28, 2000, pending, which gains priority from U.S. Provisional Application Ser. No. 60/172,897, filed on Dec. 21, 1999, abandoned.

FIELD OF THE INVENTION

The present invention relates to a polyvinyl alcohol copolymer latex made by the process of emulsion polymerization. Such copolymer latex compositions can be useful for applications in which latex emulsions are used as binders or in the preparation of coating formulations.

BACKGROUND OF THE INVENTION

Polyvinyl alcohol (PVOH) has long been used as a protective colloid in the manufacture of polymer emulsions to stabilize such emulsions. The literature teaches that, for example, 2% to 10% of PVOH, based on the weight of the monomers being polymerized, may be used as an effective stabilizer in emulsion polymerization. The surfactancy and the effectiveness as a protective colloid both increase as the residual acetate content increases. Such PVOH stabilized emulsions contain almost exclusively polyvinyl acetate, and if other monomers are used, surfactants may be required to keep the latex polymer particles suspended and the emulsion stabilized.

The use of PVOH as a stabilization agent in vinyl acetate homo- and co-polymerization is widely known and has been illustrated in a number of patents. Recently, three patents or applications have been published which utilize polyvinyl alcohol in some way to prepare stabilized butadiene and styrene-butadiene copolymer emulsions. The first publication (Japanese Patent No. 61 79,705) teaches a two-step process to produce a PVOH-stabilized polymer. The first step involves making thiol-modified polyvinyl alcohol, which is produced through a co-polymerization of vinyl acetate and thiolactic acid or thioacetic acid and subsequent hydrolysis. In a second step, the modified PVOH polymer is used to stabilize a styrene-butadiene emulsion. The process used in the present invention does not use thiol groups.

The second publication (EP-A 516,360) utilizes a co-solvent such as methanol during the emulsion polymerization of butadiene to facilitate the interaction and stabilization of the latex by the polyvinyl alcohol. It is believed that the presence of the stabilizing solvent fosters the grafting of the polybutadiene onto the polyvinyl alcohol during the emulsion polymerization. In a subsequent step, the methanol solvent is removed through a stripping process to yield the final polybutadiene-polyvinyl alcohol latex. The present invention does not involve the use of a solvent but nevertheless yields stable water-based latex emulsions.

The third publication (U.S. Pat. No. 5,830,934) teaches to utilize a functionalized silane component that is incorporated into a growing emulsion polymer. The use of the silane facilitates the adsorption of a protective colloid such as polyvinyl alcohol onto a butadiene-containing emulsion copolymer to provide stabilization to the polymer. The copolymers of the present invention do not require a functional silane as a necessary component which is incorporated into the polymer to provide polymer stability.

EP 44 995, issued to Cassella A G, teaches the preparation of graft copolymer dispersions wherein vinyl compounds such as N-vinyl-N-methylacetamide are grafted onto a high molecular weight PVOH backbone. In SU 798212 (Anastasovski et al.), the preparation and application of acrylonitrile/methyl methacrylate/PVOH grafted latexes is described.

JP No. 50-34630 (Ogura et al.) describes the synthesis of modified PVOH/acrylic latexes. In this invention, the PVOH is first partially urethanated prior to using it in an emulsion polymerization with a (meth)acrylic ester monomer.

SUMMARY OF THE INVENTION

The present invention deals with polyvinyl alcohol copolymer latex compositions. In the broadest aspect, the copolymer latex composition comprises an intimate polymer composition obtained from 10% to 60% by weight of a substantially hydrolyzed low molecular weight polyvinyl alcohol (PVOH); 2% to 80% by weight of at least one diene; 2% to 80% by weight of at least one hydrophobic monomer other than a diene and optionally either up to 10% by weight of at least one hydrophilic ethylenically unsaturated acid monomer or up to 40% by weight of a cationic monomer, wherein the above listed ingredients add up to 100% dry weight of the above listed starting polymerization reactants employed. The resulting copolymers may be nonionic, cationic or anionic. A modification of the above copolymer latex composition is a feature of this invention when part of the PVOH, e.g., up to 80% of the amount specified above, is added after the above specified monomers have been polymerized. The copolymer latex composition can be prepared as an emulsion from an aqueous blend of the above listed monomers which are generally added at various stages during the polymerization and a free radical initiator, surfactants, and, if desirable, chain transfer agents.

DETAILED DESCRIPTION OF ILLUSTRATIVE EMBODIMENTS

One aspect of the present invention is directed to a latex polymer composition comprising a blend of polymers wherein such blend contains polymers obtained from about 10% to 60% by weight of a hydrolyzed low molecular weight polyvinyl alcohol, from about 2% to about 80% by weight of a diene, from about 2% to about 80% by weight of at least one hydrophobic monomer other than diene, and optionally, up to about 10% by weight of at least one hydrophilic ethylenically unsaturated acid monomer.

Another aspect of the present invention is a latex polymer blend composition mentioned above wherein a portion of said polyvinyl alcohol is added to the reactor after the initially added portion of polyvinyl alcohol and the other monomers have been copolymerized.

A further aspect of the invention is a method of preparing the copolymer latex composition, which method comprises emulsion polymerizing an aqueous mixture of polyvinyl alcohol and the above-listed comonomers in the presence of a free radical initiator and a surfactant and a chain transfer agent, if desired. The resulting polymers may be nonionic, anionic or cationic depending on whether nonionic, anionic or cationic monomers or surfactants are employed in the polymerization reaction.

The polyvinyl alcohol (PVOH) employed in the present invention is a substantially hydrolyzed low and ultra low molecular weight PVOH. The low molecular weight PVOH is defined as having a viscosity of up to 10 centipoise in a 4% aqueous solution at 20° C. which is at least 87% hydrolyzed and the ultra-low molecular weight PVOH as having a viscosity of up to 5 centipoise in a 4% aqueous solution at 20° C. which is at least 99% hydrolyzed.

By substantially hydrolyzed PVOH is meant PVOH that is at least about 87% hydrolyzed and preferably at least about 98 mole % hydrolyzed, and more preferably, at least about 99.4% hydrolyzed. Generally, at least about 70%, preferably at least about 90% of the PVOH in the copolymer is hydrolyzed. It has been found that adding up to about 10% and preferably up to about 5% of partially hydrolyzed PVOH is advantageous in providing additional stability to the emulsion. By partially hydrolyzed is meant that the PVOH is about 70 mole % to about 87 mole % hydrolyzed. PVOH can be used in the amount of from about 15% up to about 60% by weight of the total copolymer dry weight and preferably from about 20% to about 55% and in some compositions, from about 30% to about 55%. A particularly useful amount is about 30%. The above stated amount is the total amount of PVOH employed, part of which may be added after the monomers have been polymerized.

As mentioned above, part of the PVOH may be added after the initial PVOH and the monomers have been polymerized. This is referred to below as "post-addition". It is preferable that in the initial polymerization primarily the ultra low molecular weight PVOH be employed. It is most preferable that almost exclusively the ultra low molecular weight PVOH is used, but latex compositions with good properties and good conversion may be obtained when up to 10% of the PVOH used is low molecular weight and the balance ultra low molecular weight. Improvement in polymerization conditions, conversion and properties of the copolymerized latex result with the increased percentage of the ultra low molecular weight used. Therefore, it is most preferred that substantially all PVOH used in the first stage of polymerization be of ultra low molecular weight. The ultra low molecular weight is more highly hydrolyzed, generally at least 99% hydrolyzed and more often at least 99.4% hydrolyzed. The low molecular weight PVOH is at least 87% hydrolyzed but often and preferably it is up to 98% hydrolyzed.

Suitable aliphatic conjugated dienes are $C_4$ to $C_9$ dienes and can include, for example, butadiene monomers such as 1,3-butadiene, 2-methyl-1,3-butadiene, 2 chloro-1,3-butadiene, 1,4-pentadiene, 1,5-hexadiene, octadiene, and the like. A particularly preferred aliphatic conjugated diene is 1,3-butadiene. The dienes are employed in the amount of from about 2% to about 80% by weight of the total copolymer dry weight. The preferred amount of a diene depends on what other comonomers are used. For example, if the only hydrophobic monomer (other than a diene) used is a vinyl aromatic such as styrene, it may be advantageous to use from about 2% to about 10% of a diene and from about 60% to about 75% of a vinyl aromatic or, depending on the end-use application, it may be advantageous to use only from about 60% to about 80% of a diene and only from about 2% to about 10% of a vinyl aromatic. Preferred ratios of styrene to butadiene are about 50:50, about 40:60 and about 60:40. If, on the other hand, a second hydrophobic monomer such as acrylonitrile is also employed, it may be advantageous to use from about 30% to about 50% of a diene, from about 2% to about 10% of a vinyl aromatic and from about 25% to about 50% of another hydrophobic monomer. If an acrylonitrile is substituted for part of an aromatic vinyl compound, it may be advantageous to increase the amount of diene and decrease the total amount of the acrylonitrile and vinyl aromatic monomers if approximately the same glass transition temperature (Tg) is to be maintained. In compositions also containing the optional ethylenically unsaturated acid monomer, it is preferable to use from about 20% to about 40% of a diene, from about 30% to about 50% of at least one hydrophobic monomer and from about 1% to about 5% of an unsaturated acid.

The hydrophobic monomers (other than dienes) used in this invention include vinyl and acrylic compounds. Such monomers include, but are not limited to $C_1$–$C_8$ acrylate esters and methacrylate esters, such as ethyl acrylate, methyl acrylate, butyl acrylate, propyl acrylate, hydroxy propyl (meth)acrylate, 2-ethylhexyl acrylate, ethyl methacrylate, glycidyl acrylate, glycidyl methacrylate, hydroxypropyl methacrylate, isobutyl methacrylate, hydroxybutyl acrylate, 3-chloro-2-hydroxybutyl methacrylate, vinyl acetate, methyl methacrylate, hydroxyethyl acrylate; acrylonitriles such as acrylonitrile, alpha,beta-haloacrylonitriles, alpha, beta-bromoacrylonitrile and alpha,beta-chloroacrylonitrile; alkyl-2-haloacrylates such as ethyl-2-bromoacrylate; a vinyl aromatic such as styrene; styrene sulfonic acid; 4-tertiary butyl styrene; 4-ethyl styrene; alpha,beta-halostyrenes; chlorostyrene; alpha-methylstyrene; p-methyl styrene, divinyl toluene, tert-butyl styrene, dichlorostyrene, vinyl benzyl chloride, fluorostyrene, alkoxystyrenes (e.g., paramethoxystyrene), alpha,beta-bromovinylketone; vinyl chloride, vinylidene chloride; vinyl toluenes; divinylbenzene; vinylnaphthalenes; vinyl ethers, esters, and ketones such as methyl vinyl ether, vinyl formate, vinyl propionate, vinyl butyrate and methyl vinyl ketone; amides of acrylic and methacrylic acids such as acrylamide and methacrylamide, and combinations of any of the above listed monomers. Styrene and substituted styrenes and acrylonitrile are the most preferred hydrophobic monomers.

Although the composition containing a substantial amount, e.g. 40% to 80% by weight, of a vinyl aromatic monomer, such as styrene, is preferred, it is important to note that very useful compositions containing other hydrophobic monomers in place of styrene may be prepared. Nevertheless, it is preferable that when other monomers are used, at least a small amount, such as 2% to 5% by weight, of a vinyl aromatic such as styrene be nevertheless employed. The presence of a small amount of a vinyl aromatic helps with the polymerization, making it faster, and also helps butadiene to polymerize with other monomers, such as acrylonitrile.

One of the optional monomers is a hydrophilic ethylenically unsaturated mono and dicarboxylic monomeric acid such as the $C_3$–$C_{10}$ alkenoic acids. Preferable hydrophilic monomeric acids are employed in the amount of from about 0.5% to about 7% and most preferably from about 1% to about 5%. Examples of useful alpha,beta-unsaturated carboxylic acid monomers are acrylic acid, methacrylic acid, 2-ethylacrylic acid, 2-propylacrylic acid, 2-butylacrylic acid, itaconic acid, maleic acid, crotonic acid, fumaric acid, 2-carboxy ethyl acrylate, maleic acid, monoesters of maleic anhydride and the like and mixtures thereof.

The presence of an ethylenically unsaturated acid monomer aids in stabilizing the latex in the reactor and makes the polymerization mixture more viscous. After polymerization is completed, the polymerized acid monomer continues to stabilize the resulting latex: it helps the latex to maintain its colloidal properties and it prevents the viscosity from increasing or decreasing.

When an unsaturated acid monomer is employed the resulting copolymer is anionic. Such anionic copolymers are useful with anionic pigments but such copolymers would not be suitable with cationic pigments or other cationic polymers. For this reason the use of unsaturated acid monomers is optional and will depend on the anticipated end-use applications for the copolymer compositions.

The second optional monomer is a cationic monomer which may be used in the amount of up to about 40% by weight but preferably from about 1% to about 10% and most preferably from about 5% to about 10% by weight. Cationic monomers can be obtained by the quaternization of amine monomers with alkylating agents such as alkyl halides, benzyl halides and dialkylsulfates. Examples of such monomers are methyl chloride quaternary salt of dimethylaminoethyl acrylate, dimethyl sulfate quaternary salt of dimethylaminoethyl acrylate, benzyl chloride quaternary salt of dimethylaminoethyl acrylate; methyl chloride quaternary salt of diallylmethylamine; dimethyl sulfate quaternary salt of diallylmethylamine; benzyl chloride quaternary salt of diallylmethylamine; methyl chloride quaternary salt of diethylaminoethyl acrylate; dimethyl sulfate quaternary salt of diethylaminoethyl acrylate; benzyl chloride quaternary salt of diethylaminoethyl acrylate; methyl chloride quaternary salt of dimethylaminoethyl methacrylate; dimethyl sulfate quaternary salt of dimethylaminoethyl methacrylate; benzyl chloride quaternary salt of dimethylaminoethyl methacrylate; methyl chloride quaternary salt of N-3-dimethylaminopropyl acrylamide; methyl chloride quaternary salt of N-3-dimethylaminopropyl methacrylamide. Similarly, cationic monomers may also be obtained by the quaternization of 2-vinylpyridine and 4-vinylpyridine with alkylating agents. Examples of these monomers include methyl chloride quaternary salt of 2-vinylpyridine; methyl iodide quaternary salt of 2-vinylpryidine; dimethyl sulfate quaternary salt of 2-vinylpryidine; methyl chloride quaternary salt of 4-vinylpyridine; dimethyl sulfate quaternary salt of 4-vinylpyridine; and benzyl chloride quaternary salt of 4-vinylpyridine. Cationic styrene type monomers also can be derived from the reaction of vinylbenzyl chlorides with tertiary amines, dialkylsulfides, and trialkyl phosphates to yield vinylbenzyl ammonium, sulfonium and phosphonium quaternaries. Examples are vinylbenzyl trimethyl ammonium chloride, vinylbenzyl trimethyl sulfonium chloride and vinylbenzyl trimethyl phosphonium chloride.

Nonionic latex can be made cationic by the use of a cationic surfactant without the presence of cationic monomers. Examples of useful cationic surfactants are listed below.

Part of the PVOH employed in the preparation of the latex composition of this invention may be "post-added", that is, added to the polymerization mixture after the initially added PVOH and the monomers have been polymerized. When "post-addition" is employed, it is preferable to "post-add" at least about 60% of the total amount of PVOH that is used to make the copolymer latex composition, and most preferable to "post-add" about 70% to about 80% of the PVOH. It is also preferable that the post-added PVOH be the low molecular weight type rather than the ultra-low molecular weight, although ultra-low molecular weight could also be used by preferably in a limited amount (e.g. 25%, 15% and preferably less than 10%). The PVOH added at this stage should be hydrolyzed to the degree as discussed above.

The PVOH is post-added after the emulsion polymerization has been completed. The PVOH is pre-solubilized in water by heating in the same manner as it is done before the monomers are added before polymerization. While stirring the latex, the stabilized PVOH is gradually added to the latex over several minutes. Thereafter, the stirring is continued for a period of time to make sure that the mixture is homogeneous (e.g. about one half hour), but being careful that air is not entrapped, i.e., without creating a vortex.

The "post-addition" of PVOH stabilizes the viscosity and not only does not cause deterioration of physical properties, but surprisingly, improves some physical properties in the ultimate application of these latex copolymer compositions.

In several of the applications mentioned, improvements in strength were observed. Additionally, the "post-added" PVOH improves the compatibility with functional materials in the applications. Furthermore, post-addition aids crosslinking because it increases the number of hydroxyl groups. Viscosity may also be influenced by use of an initial catalyst. Generally the copolymer binder emulsion has a viscosity of below 1000 centipoise, preferably below 500 centipoise (Brookfield viscosity 100 rpm, No. 3 spindle) when measured at 30% aqueous solution at 20° C.

In general, the polyvinyl alcohol copolymer latex compositions of the present invention can be prepared by emulsion polymerization by a multiple feed process, whereby the monomers and polyvinyl alcohol are charged into a reactor over a period of about 5 hours or less. Preparation of the emulsion in accordance with the present invention may be accomplished by first charging water and polyvinyl alcohol into a reaction vessel and, in order to solubilize the polyvinyl alcohol, the aqueous solution is heated and stirred for a period of time from about 30 minutes to about 2 hours at a temperature of from about 90° C. to about 99° C. The solution is then cooled to a temperature of about 80° C. and a solution of a free-radical initiator, such as sodium persulfate, and a surfactant are added. A series of additions of monomers are then made, followed by sufficient time to allow for the polymerization of the monomers subsequent to each addition. If a gaseous monomer, such as butadiene, is used, the polymerization is carried out in a pressure vessel.

In general, suitable copolymer emulsions can be prepared by the copolymerization of the vinyl and/or acrylic monomers and a diene monomer in the presence of the polyvinyl alcohol in an aqueous medium and in the presence of a free-radical forming initiator such as a redox system. Generally, polymerization is carried out at a temperature within the range of about 40° to 99° C. Suitable buffering agents are used to maintain a pH between 2 and 6. Chain transfer agents are helpful in carrying out the polymerization. Illustrative examples of chain transfer agents are linear and branched alkyl mercaptans such as tert-dodecyl mercaptan (sulfole 120), linear dodecyl mercaptan and other chain transfer agents known in the art, such as 2,4-diphenyl-4-methyl-1-pentene; 1,1,3-trimethyl-3-phenylindan; 2-ethylhexylthioglycolate and others.

Various free-radical forming initiators can be used in carrying out the polymerization of the monomers, such as peroxide compounds. Combination-type systems employing both reducing agents, or activators, include bisulfites, sulfoxylates, alkali metal bisulfite-ketone adducts, or other compounds having reducing properties such as ascorbic acid, erythorbic acid and other reducing sugars. The oxidizing agents include hydrogen peroxide, organic peroxides such a t-butyl hydroperoxide and the like, persulfates, such as ammonium, sodium or potassium persulfate, and the like. Specific redox systems which can be used include hydrogen peroxide and erythorbic acid; hydrogen peroxide, ammonium persulfate or potassium persulfate with sodium metabisulfite, sodium bisulfite or ferrous sulfate; t-butyl hydroperoxide with sodium bisulfite-acetone adduct. Other free radical forming systems that are well known in the art can also be used to polymerize the monomers. Persulfates are preferred in that they seem to provide a higher grafting efficiency.

The oxidizing agent is generally employed in an amount of about 0.01% to about 4%, preferably about 0.05% to about 2.0% based on the weight of the monomers and of the PVOH initially added before polymerization introduced into the polymerization reactor. The reducing agent is ordinarily added in the necessary equivalent amount.

Although the inventors do not wish to be limited by any theory of the formation of polymers and by the types of polymers that it is believed are formed, it is generally recognized that when the polymerization mixture contains a low molecular weight polymer such as PVOH and monomers, a number of competing polymerization reactions are likely to take place.

The preparation of the polymer latex composition of the present invention would suggest to one skilled in the art that the final polymer latex composition is an intimate blend of a number of different copolymers and also possibly homopolymers obtained from the polymerization of the above listed monomers. Thus, it is likely that the composition contains at least some polyvinyl alcohol homopolymer, a substantial amount of the polymer composition contains a graft copolymer wherein said conjugated diene monomer, the hydrophobic monomers and the hydrophilic unsaturated monomeric acid monomers, if present, are grafted onto the polyvinyl alcohol backbone. It is also likely that various random copolymers are formed from the hydrophobic monomers and conjugated dienes and the hydrophilic ethylenically unsaturated monomeric acids. It is also possible, and likely that certain block copolymers are formed. One skilled in the art may control the polymerization to favor the formation of predominantly certain types of polymers, but it is not likely that only one specific type of a copolymer can be exclusively obtained. For example, to maximize the formation of graft copolymers, the initiator should be added to aqueous PVOH first and the addition of monomers should be delayed for a period such as 10 minutes, 20 minutes or 30 minutes. The longer the delay, the greater portion of the monomers will be grafted onto the backbone polymer. If it is desirable to minimize the amount of grafting, the monomers should be added immediately after the addition of the initiator. The amount of grafting can also be affected by the type of the initiator that is employed. For example, sodium, potassium or ammonium persulfates generally create more active sites on the PVOH and, therefore, increases grafting. The azo initiators tend to create fewer sites and, therefore, encourage the formation of random copolymers. It is believed that about 10–30% of the copolymer formed is graft copolymer. Generally, the copolymer latex composition would likely contain at least about 5% by weight of a graft copolymer, based on the dry weight of the copolymer composition, and possibly up to about 40% of a graph copolymer.

The latex compositions that contain higher amounts of graft copolymer generally possess stronger physical properties. Therefore, to increase the strength of a copolymer composition, it may be desirable to increase the amount of graft copolymer up to about 60% or even up to about 70%, which can be done by employing the above discussed methods. The rest of the composition will likely contain random copolymers and probably some block copolymers. It is not likely that butadiene blocks would be formed if it is forced to polymerize in such a manner by the concentration effect. Dienes such as butadiene prefer to form random copolymers, especially with monomers such as styrene. However, styrene forms block copolymers more easily with other monomers, such as acrylonitrile.

Thus, the final composition of this emulsion latex can be of different molecular constructions. The idealized model of this polymerization features the polyvinyl alcohol as a macro-initiator for the styrene-butadiene or styrene-butadiene-acrylonitrile or styrene polymers. Rather than serving as the locus of initiation, the polyvinyl alcohol could also serve a number of other roles during the polymerization. The polyvinyl alcohol could conceivably act as a protective hydrocolloid to work in conjunction with the surfactant of the emulsion polymerization to form nucleation sites for the polymer particles. In this case, the growing styrene-butadiene polymer would have opportunity to form an interpenetrating network with the polyvinyl alcohol rather than a graft. Alternatively, the polyvinyl alcohol may act as a steric stabilizing agent for the monomer droplets and polymer particles in the emulsion polymerization. Finally, the aqueous solubility of the polyvinyl alcohol may preclude interaction with the growing polymer chains until particle size and surface area favor the absorption of the polyvinyl alcohol onto the exterior of the polymer particles. In each of these cases, the role of the polyvinyl alcohol as a macromolecular initiator and subsequent inter-polymer grafting would be reduced. In any case, the presence of the polyvinyl alcohol during the formation of the emulsion polymer leads to an intimate intermolecular polymer associate that gives outstanding application properties.

In the polymerization system employed in the present invention, the PVOH may act as a colloidal stabilizer. However, it is important to employ additionally a conventional surfactant and emulsifying agent which can be anionic, nonionic, or cationic type. Nonionic surfactants are selected from the family of alkylphenoxypoly(ethyleneoxy) ethanols where the alkyl group typically varies from $C_7$–$C_{18}$ and the ethylene oxide units vary from 4–100 moles. Various preferred surfactants in this class include the ethoxylated ocryl and nonyl phenols, and in particular ethoxylated nonyl phenols with a hydrophobic/lipophilic balance (HLB) of 15–19. Anionic surfactants can be selected from the broad class of sulfonates, sulfates, ethersulfates, sulfosuccinates, diphenyloxide disulfonates, and the like, and are readily apparent to anyone skilled in the art. Preferred surfactants can include, but are not limited to, alkyl esters and half-esters of salts of sulfosuccinic acid; alkali and ammonium salts of alkyl sarcosinates, alkyl diphenyloxide disulfonic acid salts, alkylphenol ethoxylates, alkyl acetylenic diols and alkyl glucosides, polyoxyethylene alkyl phenyl ether, polyoxyethylene alkyl alkenyl phenyl ether, and the like. Cationic surfactants are usually quaternary ammonium salts. Examples are trimethyldecyl quaternary ammonium chloride, trimethylcetyl quaternary ammonium chliride, tallow imidazoline quaternary, cocoalkyl trimethyl quaternary ammonium chloride, and coco hydroxyethylimidazoline. A tabulation of commercially available cationic emulsifiers may be found in McCutcheon,s Emulsifiers & Detergents, pp 263–264, 1990 Edit.; McCutcheon Division, MC Publishing Co., 175 Rock Road, Glen Rock, N.J. 07452 USA.

It is important to note than an appropriate type of surfactant should be employed, depending on the type of optional monomer employed and on the type of polymer latex that is desired. If the polymer composition does not contain an optional monomer and a nonionic surfactant is employed, a nonionic copolymer latex will be obtained. However, if the same polymer is prepared but a cationic monomer is used, a cationic polymer latex will be obtained and if an anionic surfactant is used, an anionic polymer latex will be obtained. When an ionic surfactant is employed with nonionic monomers, an ionic polymer results because the surfactant particles become physically associated with the polymeric latex particles such as by becoming embedded in or entrapped by the polymeric particle. If an anionic ethylenically unsaturated carboxylic acid monomer is employed, either a nonionic or an anionic surfactant must be used and the resulting polymer latex will be anionic. If a cationic monomer is employed, a nonionic or a cationic surfactant must be used and the resulting polymer latex will be cationic. As a rule, a cationic surfactant cannot be used with anionic monomers and anionic surfactants cannot be used with cationic monomers.

The polymers of the present invention will undergo some crosslinking. The free radical initiator will cause some butadiene monomers to polymerize with different copolymer chains and in so doing, create crosslinks between those chains. However, the copolymers may be crosslinked to a greater degree by adding to the polymerization mixture a crosslinking agent or monomer.

Such crosslinking would be suggested if certain physical properties are desired to be modified or attained. For example, if the graft copolymer is to be used in a printing process where water resistance of the paper is desired, crosslinking the copolymer would help attain the desired result. Additionally, the graft copolymer can crosslink with UF resins to provide superior chemical and high temperature resistance in saturated media (i.e., filter paper).

A common crosslinking monomer used in the art is N-methylol acrylamide (NMA). However, the NMA-based systems also release formaldehyde as they cure, which is a cause of health, environmental and regulatory concern. Other crosslinking systems are known but also seem to depend on one minor component reacting with another minor component. In this invention, a minor amount of crosslinker additive reacts with a major component, i.e., the grafted PVOH colloid, to effect the crosslinking reaction. This is inherently a more efficient process. Suitable crosslinking reagents include, colloidal silica; salts or chelates of transition metals such as titanium or zirconium chelates; melamine formaldehyde resins, phenolic resins, DMDHEU-type textile resins, and a glyoxal compound such as a blocked glyoxal resin. The glyoxal compound includes glyoxal or a blocked glyoxal resin as described in U.S. Pat. No. 4,695,696 wherein the glyoxal is blocked by reaction with a blocking component (e.g. urea) to inhibit it from reacting with other components prior to drying. The crosslinking agent may be added at about 0.01% to 20%, preferably 0.5% to 10%, by weight of PVOH. The nonwoven products prepared have been found to provide equal or better tensile strength and elongation resistance of saturated media when compared to commercial acrylic lattices crosslinked using formaldehyde based N-methylol acrylamide technology. Uniquely, crosslinking may be effected without additional crosslinking agents because of crosslinking due to the hydrogen bonding effects of the hydroxyls of the PVOH.

The copolymer emulsions can be produced having a high solids content of 15% to 45%. Any thickening upon standing which does occur is reversible upon heating or applying shear by means of shaking or vigorous agitation. This thickening may be ameliorated by incorporation of a viscosity-modifying agent such as urea. It was unexpectedly found that incorporation of a few percent (e.g. 5 to 30%) of a partially hydrolyzed ultra low molecular weight PVOH also stabilized the viscosity without loss of physical properties or imparting excessive viscosity. Viscosity may also be influenced by use of an initial catalyst. Generally the copolymer binder emulsion has a viscosity of below 1000 centipoise (Brookfield, 100 rpm, No. 3 spindle), preferably below 500 centipoise when measured at 30% aqueous solution at 20° C.

It will be understood that other additives may be incorporated into the aqueous emulsion, including fixing agents, wetting agents, softeners-foam-inhibiting agents, froth aids, flame retardants, dispersing agents, pH adjusting components, surfactants, biocides and other components.

The copolymer emulsion of the invention can be used as a binder for various materials such as to prepare unsaturated filter paper, nonwoven products, or fabric coated substrates, by a variety of methods known in the art. These generally involve the impregnation of a loosely assembled mass of fibers or inorganic pigments with the binder latex, followed by a moderate heating to dry the mass.

The polymer latex composition of the present invention can find varying uses as binders for the adhesion of particles such as clays, calcium carbonate, inorganic pigments such as titanium oxides, and fibers such as cellulosic, polyester, polypropylene, nylon and others. Thus, these latices may be used for substrate saturation for filter media and roofing materials, in durable non-wovens, as carrier for fluorescent whitening aids to increase the whiteness and brightness of papers, nonwoven fabrics, and textiles, or in coating formulations for paper and non-impact printing substrates, including films. The latices may be spray dried to obtain dry particles of the copolymer blend and when needed, may be rehydrated by slowing adding the powder to water with stirring.

In order to demonstrate the practice of the present invention, the following examples have been prepared and tested. The examples should not, however, be viewed as limiting the scope of the invention. The claims will serve to define the invention.

EXAMPLES

Example 1

The following is a procedure typically employed in preparing the polymer emulsion of the present invention. To a reactor is added 2,080 g of deionized water. The reactor is equipped with a mechanical agitator, nitrogen sparge, temperature probe, condenser and monomer inlet using suitable adapters. The ambient water is agitated, to which is added 8.0 g of itaconic acid, 0.84 g of sodium dodecyl diphenyl oxide disulfonate (Dowfax 2A1 surfactant), and 6.0 g of an alkyl glucoside surfactant. To the foregoing mixture is added 319.3 g of fully hydrolyzed, ultra low molecular weight PVOH (Airvol 103, by Air Products Corporation, 98% hydrolyzed), and 16.8 g of partially hydrolyzed ultra low molecular weight PVOH (Airvol 203, 87.0%–89.0% hydrolyzed). A slow nitrogen sparge is started and the contents are heated to 90° C. for 30 minutes to solubilize the PVOH.

The reactor is then cooled to 77° C. and 120 g of deionized water containing 4.0 g of sodium persulfate is added. After ten minutes, a mixture of 36.4 g of 451.0 g of styrene, and 6.0 g of tertiary dodecyl mercaptan (Sulfole 120), are added to the reactor, along with 32.0 g of butadiene. The mixture is allowed to react for twenty minutes. Subsequently, 78 g of solution S is added along with 64.0 g of butadiene and the mixture allowed to react for 30 minutes. A solution of 120.0 g of deionized water containing 2.4 g of Dowfax 2A1 surfactant and 2.4 g of sodium persulfate is added to the reactor and allowed to react for 10 minutes. Seventy-eight grams of solution S, 64.0 g of butadiene and 4.8 g of acrylic acid are then added to the reactor and allowed to react for 40 minutes. An additional 78.0 g of solution S are then added to the reactor, along with 64.0 g of butadiene and 4.8 g of acrylic acid and allowed to react for 30 minutes. A solution of 80.0 g of deionized water containing 16.0 g of Dowfax 2A1 and 2.4 g of sodium persulfate is added to the reactor and allowed to react for 10 minutes. An additional 78.0 g of solution S, 64.0 g of butadiene and 4.8 g of acrylic acid are added to the reactor and allowed to react for 40 minutes. A final 78.0 g of solution S, 64.0 g of butadiene and 4.8 g of acrylic acid are then added to the reactor and allowed to react for 60 minutes.

A finishing solution of deionized water (48.0 g), sodium persulfate (1.0 g), Drew L198 defoamer (a silica-hydrocarbon mixture) and a solution of 13% sodium hydroxide is added and allowed to react for 90 minutes to consume any residual monomer. The batch was cooled to 35° C. A biocide (isothiazolinone) in an amount equal to 10–500 ppm was also added. A white fluid emulsion was obtained having 30% solids, a viscosity of 95 cps (Brookfield viscosity, #3 spindle, 100 rpm), and a particle size of 187 nm.

Example 2

A batch was prepared as in Example I except that the styrene mixture was replaced with the mixture of 353.0 g of styrene, 8.8 g of Sulfole 120 and 103.0 g of acrylonitrile. The resulting product was a white fluid emulsion having 30% solids, a viscosity of 1,050 cps (Brookfield viscosity, #3 spindle, 100 rpm), and a particle size of 184 nm.

Example 3

To a reactor is added 1,260.0 g of deionized water. The reactor is equipped with a mechanical agitator, nitrogen sparge, temperature probe, condenser and monomer inlet using suitable adapters. The ambient water is agitated and 5.6 g of Dowfax 2A1surfactant, 9.0 g of itaconic acid, 45.0 g of styrene and 1,161.0 g of a 19.4% solution of fully hydrolyzed, ultra low molecular weight PVOH (Airvol 103, by Air Products Corporation, 98% hydrolyzed) are added to the reactor. A slow nitrogen sparge is started and the contents are heated to 77° C. for 30 minutes.

After the reactor reaches 77° C., 135.0 g of deionized water containing 4.5 g of sodium persulfate is added to the reactor. After ten minutes, 15.9 g of solution S containing 180.0 g of styrene and 10.8 g of tertiary dodecyl mercaptan (Sulfole 120) is added to the reactor along with 53.7 g of butadiene. The mixture is allowed to react for sixty minutes. Subsequently, 15.9 g of solution S along with 53.7 g of butadiene are added and the mixture allowed to react for sixty minutes. Two more additions identical to the previous two are made to the reactor. After each addition, the contents of the reactor are allowed to react for sixty minutes. After the fourth addition to the reactor, a solution of 90.0 g of deionized water containing 18.0 g of a 15% solution of Dowfax 2A1 surfactant and 2.7 g of sodium persulfate are added to the reactor. The reaction is allowed to proceed for fifteen minutes before the addition of 15.0 g of solution S and 53.7 g of butadiene. After this addition, the contents of the reactor are allowed to react for sixty minutes. Three more additions of 15.9 g of solution S and 53.7 g of butadiene are made with a reaction time of sixty minutes between increments. Sixty minutes after the ninth addition to the reactor, a solution of 90 g of deionized water containing 18.0 g of a 15% solution of Dowfax 2A1 surfactant and 2.7 g of sodium persulfate are added to the reactor. The reactor is allowed to react for fifteen minutes. The reactor is then charged with 15.9 g of solution S, 5.4 g of acrylic acid and 53.7 g of butadiene. The reaction is allowed to proceed for sixty minutes followed by the addition of 15.9 g of solution S, 5.4 g of acrylic acid and 53.7 g of butadiene. Two identical additions are made to the reactor with intervening sixty minute reaction times for a total of fourteen additions to the reactor. After the final addition to the reactor, a finishing solution of 54.0 g of deionized water, 2.3 g of a defoamer (Drew L-198), 1.1 g of sodium persulfate and 78.8 g of a 13% sodium hydroxide solution are added to the reactor. The contents are allowed to react for sixty minutes and the reactor is cooled to 25° C. A biocide (isothiazolinone) in an amount equal to 250 ppm was also added. A white fluid emulsion was obtained having 30% solids, a viscosity of 120 cps (Brookfield viscosity, #3 spindle, 100 rpm), and a particle size of 163 nm.

Example 4

A batch was prepared as in Example 3 except that the only unsaturated acid monomer employed was 21.6 g of acrylic acid. The emulsion obtained has a viscosity of 60 cps (Brookfield viscosity, No. 3 spindle, 100 rpm) and particle size of 150 nm.

Example 5

A batch was prepared as in Example 3 except that the only unsaturated acid monomer employed was 21.6 g of methacrylic acid. The emulsion obtained has a viscosity of 100 cps (Brookfield viscosity, No. 3 spindle, 100 rpm) and particle size of 220 nm.

Various modifications and alterations that do not depart from the scope and spirit of this invention will become apparent to those skilled in the art. This invention is not to be duly limited to the illustrative embodiments set forth herein.

What is claimed is:

1. A method for preparing a latex, the method comprising:
   providing an aqueous solution of polyvinyl alcohol;
   adding a free-radical forming initiator to the aqueous solution of polyvinyl alcohol; and
   adding monomer to the solution of polyvinyl alcohol and initiator at least 10 minutes after said adding a free-radical forming initiator to the aqueous solution of polyvinyl alcohol;
   allowing the monomer to polymerize in the presence of the initiator and polyvinyl alcoholic to form the latex.

2. The method of claim 1, where said providing an aqueous solution of polyvinyl alcohol includes charging water and polyvinyl alcohol to a reactor and heating the resulting mixture for at least 30 minutes at a temperature of about 90° C. to about 99° C. prior to said adding monomer.

3. The method of claim 2, further comprising allowing the aqueous solution of polyvinyl alcohol to cool prior to said adding a free-radical forming initiator.

4. The method of claim 1, where the free-radical forming initiator is sodium persulfate.

5. The method of claim 1, where said aqueous solution of polyvinyl alcohol includes at least 16% by weight polyvinyl alcohol.

6. The method of claim 4, where said adding a free-radical forming initiator to the aqueous solution of polyvinyl alcohol includes adding at least 0.01 gram of sodium persulfate per gram of polyvinyl alcohol.

7. The method of claim 1, where the monomer includes at least one conjugated diene.

8. The method of claim 7, where the monomer further includes at least one hydrophobic monomer other than a diene.

9. The method of claim 8, where the monomer further includes at least one cationic monomer.

10. The method of claim 1, further comprising adding additional polyvinyl alcohol after said adding monomer.

11. A method for preparing a latex, the method comprising:
   providing an aqueous solution of polyvinyl alcohol, wherein said aqueous solution of polyvinyl alcohol includes at least 16% by weight polyvinyl alcohol;
   adding a free-radical forming initiator to the aqueous solution of polyvinyl alcohol, where the free-radical forming initiator is sodium persulfate and the sodium persulfate is added in an amount of at least 0.01 g of sodium persulfate per gram of polyvinyl alcohol; and
   adding monomer to the solution of polyvinyl alcohol and initiator at least 10 minutes after said adding a free-radical forming initiator to the aqueous solution of polyvinyl alcohol allowing the monomer to polymerize in the presence of the initiator and polyvinyl alcohol to form the latex.

12. The method of claim 1, where said adding monomer occurs 20 minutes after said adding a free-radical forming initiator.

13. The method of claim 11, where said adding monomer occurs 20 minutes after said adding a free-radical forming initiator.

* * * * *